May 21, 1940.  L. W. WILLIAMS ET AL  2,201,418
FILTER
Filed Aug. 31, 1937
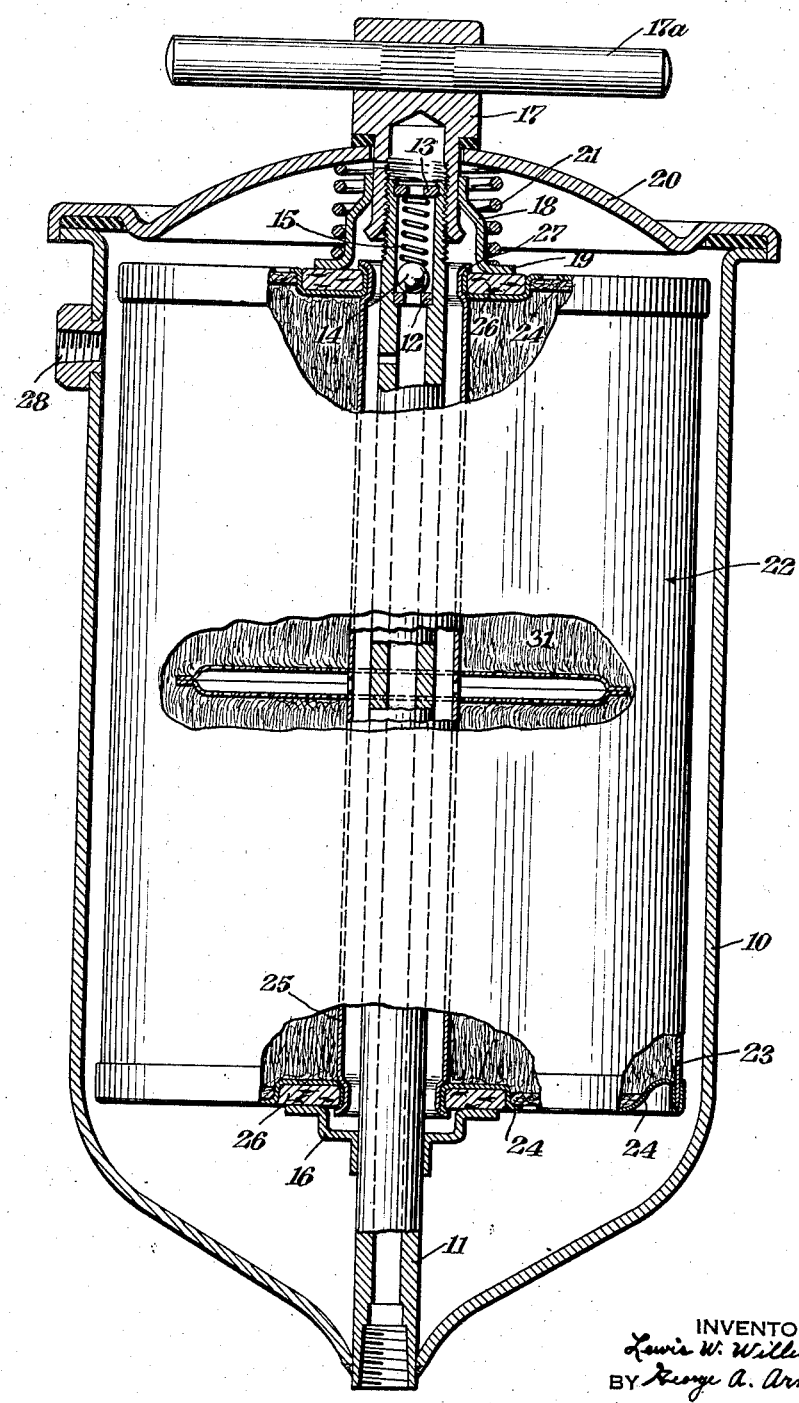
INVENTORS
Lewis W. Williams
BY George A. Arnold
Kenyon & Kenyon
ATTORNEYS Patented May 21, 1940

2,201,418

UNITED STATES PATENT OFFICE 2,201,418

FILTER

Lewis W. Williams, Short Hills, and George A. Arnold, Chatham, N. J., assignors to Motor Improvements, Inc., Newark, N. J., a corporation of Delaware Application August 31, 1937, Serial No. 161,728

8 Claims. (Cl. 210—131)

This invention relates to filters and more especially to filters of the type embodying a replaceable filtering unit. In one form of such filter the filtering unit is supported by a hollow post through which liquid to be filtered is supplied to the interior of the filtering unit. The filtering unit is enclosed in a shell having a removable cover and an outlet port is provided in the shell for discharging the filtered liquid.

An object of this invention is an improved filter unit for such type filter and the provision of filter unit supporting means which will facilitate insertion and removal of the filtering unit for assembly and replacement and which will securely seal the unit to prevent liquid bypassing the unit.

The filtering unit of this invention preferably embodies a cylindrical metal casing having perforated ends and a tube extending between and through said casing ends. Within the casing is contained filtering material surrounding the tube which communicates with a distributor extending into the body of filtering material. The filtering unit is adapted to fit over the hollow post of the filter housing and to have liquid supplied to the interior of the tube from said post. At the ends of the central tube the casing is preferably provided with gaskets which are engaged by sealing members coaxial with the post to close each end of the central tube and thus prevent bypassing of liquid around the filtering material. One of the sealing members is fixed relative to the post and the other sealing member is spring-pressed toward the fixed member, and one of the sealing members is carried by the cover so that the attachment of the cover to the shell brings the sealing members into operative engagement with the gaskets.

Other objects, novel features and advantages of the invention will be apparent from the following specification and the accompanying drawing which is a vertical section through a filter embodying the invention.

The shell 10 has its lower end inwardly tapered and in such lower end is supported a hollow post 11 extending centrally of the shell and slightly above its upper edge. In the upper end of the post are arranged two spaced washers 12 and 13; and a ball 14 is pressed against the washer 12 by a spring 15 interposed between the ball and the washer 13, the ball 14 normally serving to close the opening in the washer 12. Near the bottom of the post 11 is provided an annular stop or sealing member 16 which is fixed to the post and the upper end of the post is exteriorly threaded to receive a nut 17. A collar 18 is rotatably mounted on the lower portion of the nut 17 and has a flange 19 or sealing member at its lower end. A portion of the nut 17 extends through an aperture in the cover 20 for the shell 10 whereby the nut is rotatably mounted in the cover and a handle 17a is provided for rotating said nut. A spring 21 is interposed between the cover and the flange 19 and the sleeve 18 is prevented from slipping off the lower end of the nut 17 by an enlargement formed thereon after assembly of the sleeve and nut.

A cylindrical filtering unit 22 having a central bore is arranged within the shell 10 with the post extending through the bore. The lower end of the unit 22 rests upon the support 16 while the flange 19 of the sleeve 18 engages the top of the unit. The cover 20 is held in place by the nut 17 and the flange 19 is pressed against the top of the unit 22 by the spring 21. The unit 22 consists of a cylindrical imperforate metal casing 23 having perforated metal ends 24 mechanically sealed thereto. Also, a central metal tube 25 extends between the end members 24 and has its ends mechanically sealed to said end members. Each end member is centrally depressed around the tube 25 and in each depression preferably is arranged a gasket 26 one of which engages the support or sealing member 16 and the other of which is engaged by the flange or sealing member 19. Each end of the tube 25 is bent out slightly to form a flange 27 which holds the corresponding gasket in its socket. The casing contains suitable filtering material such, for example, as cotton waste and communication is provided for delivering liquid from the bore of the post 10 to a distributor 31 in the interior of the body of filtering material.

The filtering unit is assembled with the shell merely by sliding the tube 25 over the post 11 until the sealing member 16 is engaged by the gasket 26 in the lower end of the casing. The nut 17 is then screwed onto the threaded end of the post 11, thereby bringing the sealing member 19 into engagement with the gasket 26 at the upper end of the casing, and also clamping the cover 20 to the rim of the shell 10. Oil to be filtered is passed through the tube 11 into the interior of the filtering unit and the filtered oil escaping from the ends of the filtering unit is discharged through the outlet 28 provided for that purpose in the wall of the shell 10. The engagement of the sealing members 16 and 19 with the gaskets 26 closes the ends of the tube 25 and insures that all oil passing through the filter goes into the filtering unit 22. In the event that the oil supplied to the tube 11 is too viscous to pass through the filtering material, it is by-passed through the washers 12 and 13 by yielding of the spring 15, and passes into the casing through the aperture 29 in the nut 17 in the space between the unit 22 and the shell 10. When it is desired to replace a spent filtering unit with a new one, the nut 17 is disengaged from the upper end of the post 11, thereby removing the cover 20 and disengaging the sealing member 19 from the upper gasket 26. Thereupon the spent filtering unit is lifted out by means of the handle 30 provided for that purpose and a new filtering unit is inserted in the manner previously described.

We claim:

1. In a filter, a shell, a threaded hollow post within said shell, a cover for said shell, a nut rotatably connected to said cover for cooperation with said threaded post to fasten said cover to said shell, a filtering unit surrounding said post, said post having a port leading to said filtering unit, a support within said casing with which one end of said unit engages, a member slidably supported by said nut for engagement with the other end of said unit and a spring interposed between said cover and said member.

2. In a filter, a shell, a threaded post within said shell, a cover for said shell, a nut rotably connected to said cover for cooperation with said threaded post to fasten said cover to said shell, a filtering unit surrounding said post and comprising a casing containing filtering material, a first member on said post with which one casing end engages, a second member slidably supported by said nut for engagement with the other casing end and a spring urging said second member toward said first member.

3. In a filter, a shell, a cover for said shell, a post supported at one end by said shell and being screw threaded at its other end, a nut rotatably connected to said cover for engagement with the threaded end of said post to clamp said cover to said shell, a filtering unit surrounding said post and comprising a casing containing filtering material, a supporting member fixed to said post and engaging one end of said casing, a second supporting member slidably carried by said nut and engaging the other end of said casing, and resilient means urging said second supporting member toward said first supporting member.

4. In a filter, a shell, a cover for said shell, a post supported at one end by said shell and being screw-threaded at its other end, a nut rotatably connected to said cover for engagement with the threaded end of said post to clamp said cover to said shell, a filtering unit surrounding said post and comprising a casing containing filtering material, a first supporting member carried by said post and engaging one end of said casing, and a second supporting member carried by said nut and engaging the remaining end of said casing, one of said supporting members being fixed and the other supporting member being spring-pressed toward said fixed supporting member.

5. In a filter, a shell, a cover for said shell, a post supported at one end by said shell and being screw-threaded at its other end, a screw-threaded member rotatably supported by said cover for engagement with the threaded end of said post to clamp said cover to said shell, a filtering unit surrounding said post and comprising a casing containing filtering material, a gasket in each end of said casing, a first sealing member fixed to said post and engaging one end gasket, a second sealing member slidably supported by said screw-threaded member and engaging the other end gasket, and resilient means urging said second sealing member toward said first sealing member.

6. In a filter, a shell, a cover for said shell, a post supported at one end by said shell and being screw-threaded at its other end, a screw-threaded member rotatably supported by said cover for engagement with the threaded end of said post to clamp said cover to said shell, a filtering unit surrounding said post and comprising a casing containing filtering material, a gasket in each end of the casing, a first sealing member supported by said post and engaging one gasket, and a second sealing member supported by said threaded member and engaging the remaining gasket, one of said two sealing members being fixed and the other sealing member being spring-pressed toward said fixed member.

7. In a filter, a shell, a threaded hollow post within said shell having a port, a cover for said shell, a nut rotatably connected to said cover for cooperation with said threaded post to fasten said cover to said shell, a filtering unit surrounding said post, a support carried by said post with which one end of said unit engages, a member slidably supported by said nut for engagement with the other end of said unit and resilient means urging said member toward said support, said filtering unit comprising a cylinder having perforated end members, a tube connecting said end members, a body of filtering medium interposed between said tube and cylinder, and a distributor on said tube extending into said filtering medium.

8. In a filter, a shell, a threaded hollow post within said shell, a cover for said shell, a nut rotatably connected to said cover for cooperation with said threaded post to fasten said cover to said shell, a filtering unit surrounding said post, said post having a port leading into said filtering unit, a member supported by said post with which one end of said unit engages, a member slidably supported by said nut for engagement with the other end of said unit, one of said members being fixed and the other member being spring-pressed toward said fixed member, said filtering unit comprising a cylinder having perforated end members, a tube connecting said end members, a body of filtering medium interposed between said tube and cylinder and a distributor on said tube extending into said filtering medium.

LEWIS W. WILLIAMS.
GEORGE A. ARNOLD.